United States Patent [19]

Kissel

[11] Patent Number: 4,555,255
[45] Date of Patent: Nov. 26, 1985

[54] CORNER CONNECTOR CLIP IN AN AIR FILTER GRID

[75] Inventor: Gary T. Kissel, Louisville, Ky.

[73] Assignee: Allis-Chalmers Corporation, Milwaukee, Wis.

[21] Appl. No.: 726,914

[22] Filed: Apr. 23, 1985

Related U.S. Application Data

[63] Continuation-in-part of Ser. No. 613,143, May 23, 1984, abandoned.

[51] Int. Cl.⁴ .............................................. B01D 46/54
[52] U.S. Cl. ....................................... 55/355; 55/483; 55/484; 55/582; 55/DIG. 31
[58] Field of Search .................. 55/355, 483, 484, 493, 55/495, 502, DIG. 31; 52/144, 280, 484, 664, 665, 668, 669

[56] References Cited

U.S. PATENT DOCUMENTS

| 1,189,492 | 7/1913 | Schanman | 52/664 |
| 3,485,519 | 12/1969 | Chiu | 52/665 |
| 3,486,311 | 12/1969 | Allan, Jr. | 55/355 |
| 3,716,259 | 2/1973 | Weill et al. | 52/280 |
| 4,047,348 | 9/1977 | McSweeney | 52/484 |
| 4,088,463 | 5/1978 | Smith | 55/582 X |
| 4,233,044 | 11/1980 | Allan | 55/355 |

Primary Examiner—Charles Hart
Attorney, Agent, or Firm—Donald C. McGaughey

[57] ABSTRACT

An invertible corner connecting clip is disclosed having an out-corner unit and an in-corner unit connected together in spaced parallel right angle relation to define pockets for receiving side walls of main and cross support members of a ceiling latticework. The out-corner unit has upper and lower horizontally extending relieved areas to enable the clip to be inverted and used to complete either a right or left-hand corner and a tactile indicator to identify proper orientation of the clip for installation.

6 Claims, 7 Drawing Figures

U.S. Patent   Nov. 26, 1985   Sheet 1 of 2   4,555,255
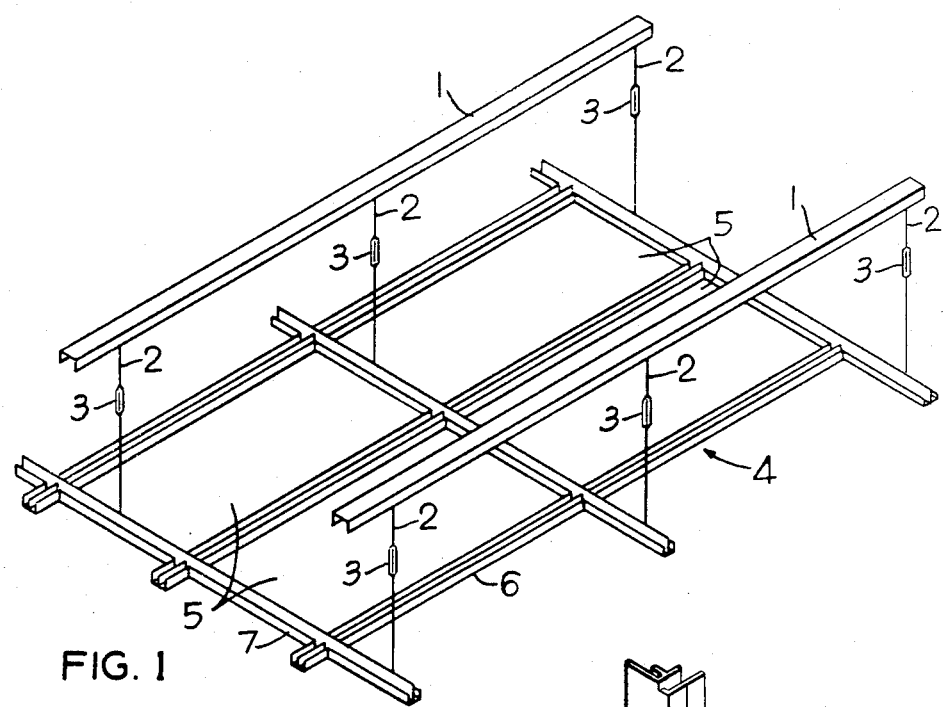
FIG. 1
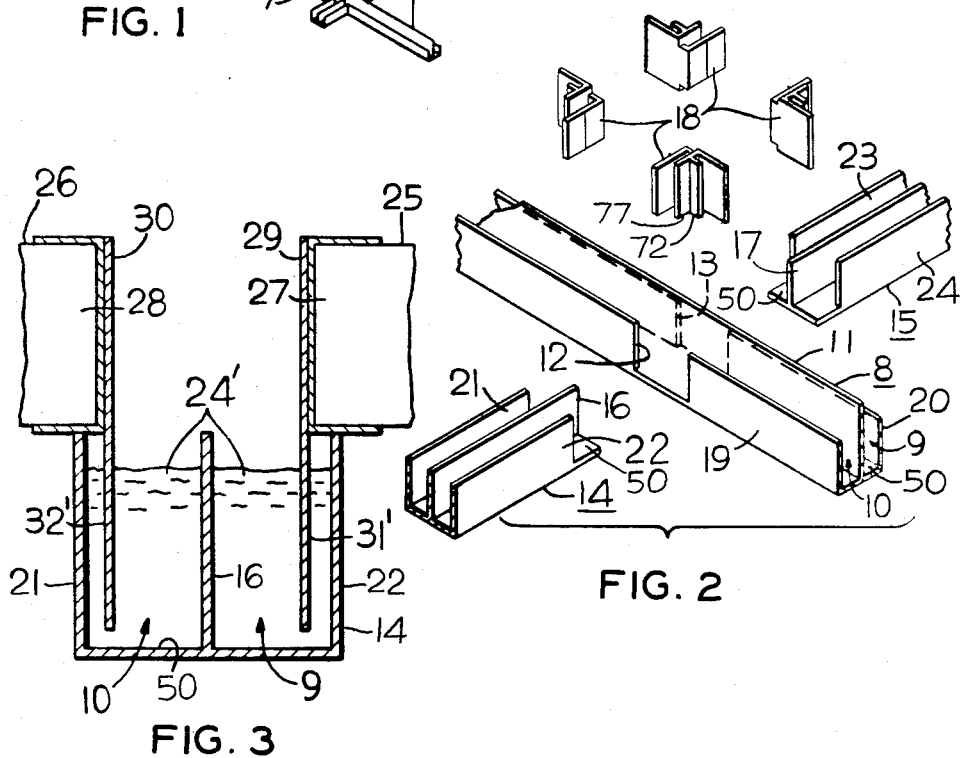
FIG. 2
FIG. 3

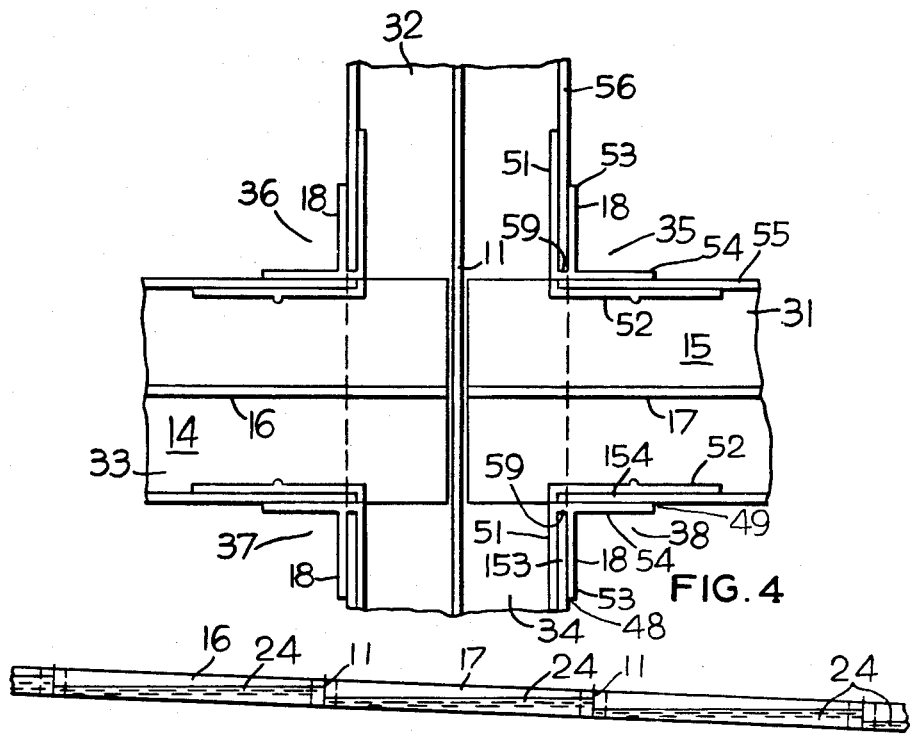
FIG. 4
FIG. 5
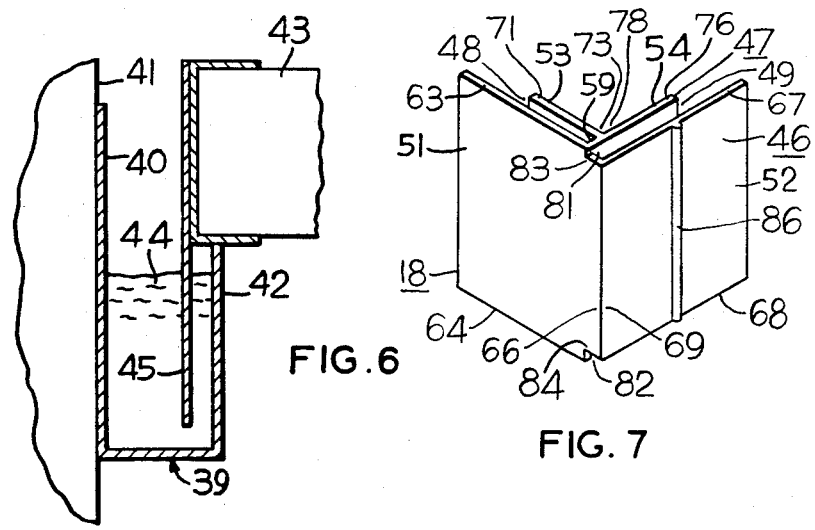
FIG. 6
FIG. 7

CORNER CONNECTOR CLIP IN AN AIR FILTER GRID

This application is a continuation-in-part of U.S. patent application Ser. No. 613,143 filed May 23, 1984 and now abandoned.

BACKGROUND OF THE INVENTION

This invention relates to a corner connecting clip and more particularly to an invertible corner connecting clip with a tactile indicator for use in assembling main cross members to form a ceiling latticework.

Clean room facilities require a dust-free environment which may be accomplished by covering the ceiling with a plurality of filters to allow a flow of clean filtered air into the clean room. A ceiling latticework is required to support the filters and a sealing system must be provided at the periphery of the filters where they are supported by the latticework to avoid bypass air leakage around the filters.

In such clean room facilities it is the practice to assemble a ceiling latticework of speed main and cross support members which define rectangular filter receiving openings. These support members are in the form of a channel formed by bottom and spaced side walls capable of containing a liquid sealant such as petroleum jelly. The filters fit into the rectangular openings and have depending peripheral flanges which seat in the sealant to seal the filter. The particulate laden air enters a chamber above the ceiling and passes downward through the filters into the clean room working area. The avoidance of bypass air leakage around the filters and into the clean room is very important. If the latticework is in a class 10 clean room, a cubic foot of air therein can contain no more than 10 particles one-half micron or larger. A cubic foot of outdoor air may contain two and one-half billion particles. The connections between the main and cross support members offer a prime source for bypass air leakage and the design and assembly of these corner areas is very important to avoid such bypass air leakage or leakage of the liquid sealant.

In assembling the latticework, the bottom and side walls of each cross member must be carefully joined and connected in fluid tight relation with the bottom and side walls of the main support members. At the present time, clean room ceilings as large as 40,000 to 50,000 square feet in area are being constructed. The standard filter element used is only 2 feet by 4 feet in size and, therefore, assembly of the filter supporting latticework requires that thousands of corner connections be made. The latticework must be assembled overhead with the installers working on scaffolds and from ladders where assembly and visual inspection are difficult. The assembly of a liquid tight latticework is very labor intensive resulting in inordinately high installation costs for clean room ceilings. Heretofore no satisfactory solution has been found to the problem of providing a ceiling latticework assembly which can be constructed error-free overhead to provide strong, reliable, low cost fluid tight connections between the main and cross members in a simple manner requiring a minimum of assembly time so that labor costs will be minimized.

SUMMARY OF THE INVENTION

Applicant's invention provides a single design of a novel invertible corner connecting clip which may be used to complete either a right or a left-hand corner connection between side walls of the main and cross support members to form a ceiling latticework. The novel invertible corner connecting clip has a relieved area adjacent both the top edge and the bottom edge of one of its out-corner plates to accommodate the thickness of the bottom wall of the cross support member as it lies upon the top surface of the bottom wall of the main support member when the invertible corner connecting clip is in an installed position, thus, a single design of connecting clip can be used to form either a right-hand corner or a left-hand corner connection. The novel invertible corner connecting clip also provides a tactile indicator for the installer. The tactile indicator facilitates proper orientation of the invertible corner connecting clip for installation without need for the installer to either make a visual inspection of the clip prior to or during its installation into the latticework.

Accordingly, it is an object of this invention to provide a single design for an invertible corner connecting clip which can be inverted as required and used to quickly complete either a right-hand or a left-hand corner and provide a strong reliable low cost connection between the side walls of main and cross support members of a ceiling latticework.

It is another object of the invention to provide an invertible corner connecting clip having a tactile indicator to facilitate proper orientation of the clip for installation.

BRIEF DESCRIPTION OF THE DRAWINGS

Referring to the drawings, the preferred embodiment of this invention is illustrated.

FIG. 1 is an isometric view of the latticework supported from the ceiling with leveling adjustments on the supporting structure;

FIG. 2 is an exploded view of the channel intersection at the corner of each filter opening;

FIG. 3 is a cross-section view taken through a filter supporting channel cross member in the assembled position with the filters in the operating position;

FIG. 4 is a plan view of the assembled intersection of the filter supporting member;

FIG. 5 is a side elevation view showing the isolated chambers around each of the filter openings;

FIG. 6 is a cross-section view taken through a wall supported channel with the filter in the operating position; and FIG. 7 is a three-dimensional view of the corner connector clip for connecting the latticework of channels.

DETAILED DESCRIPTION OF THE INVENTION

Referring to the drawings, FIG. 1 illustrates an isometric view of the latticework and its supporting structure. The support beams 1 are mounted on the ceiling of the room and each one carries a plurality of supporting struts 2 having a turnbuckle adjusting means 3. This provides a means of adjusting the level of the latticework 4 to assure retention of the liquid in the individual channel chambers around each of the plurality of filter openings 5.

Main and cross filter supporting members 6 and 7 run lengthwise and crosswise in the room and intersect to form individual channel chambers around each filter opening.

FIG. 2 illustrates a manner of constructing the intersection of the filter supporting members. As all of the cross members and the main members are the same, only the connection between a main member 8 and cross members 14 and 15 will be described in detail. The main filter supporting member 8 comprises a bottom wall 50 from which spaced apart side walls 19 and 20 and a center wall 11 extend vertically to form a double channel having a sealant retaining channel chamber 9 and sealant retaining channel chamber 10. The center dividing wall 11 is connected to a strut 2 placed along the length of the wall to support the main filter supporting member. At intervals along the length of the member 8, segments of the side walls 19 and 20 are cut away to form openings 12 and 13 to receive cross members 14 and 15. The cross member 14 has a bottom wall 50 and vertically extending side walls 21, 22 spaced apart from a vertical center wall 16. The cross member 15 has a bottom wall 50 and vertically extending side walls 23, 24 spaced apart from a vertical center wall 17. The cross members 14 and 15 extend into the openings 12, 13 until the ends of center walls 16 and 17 abut the center wall 11 of the main filter supporting member 8 with the bottom wall 50 of each cross member overlying the bottom wall 50 of the main member. This preliminary assembly places the side walls 14, 15 of each cross member in right and left-hand corner forming relation with the adjacent side walls 19 and 20 of main support member 8. To make the final assembly, a single design of invertible corner connecting clip 18 is used for both the right and left-hand corners. For convenience of reference, the word clip will be used hereinafter to mean the invertible corner connecting clip. The clip 18 is inverted, as will be described, to complete either a right-hand or a left-hand corner connection.

With reference to FIG. 7, a single design of clip 18 is shown which is adapted to be inverted as required to complete either a right-hand or a left-hand corner assembly. The clip 18 comprises an out-corner unit 46 and an in-corner unit 47 connected in spaced parallel relation by connecting means in the form of flange 59 to form pockets 48, 49 adapted to receive main and cross member side walls. The out-corner unit 46 has a first out-corner plate 51 having first horizontally extending upper and lower edges 63, 64 and a first vertical common edge 66; and a second out-corner plate 52 having second horizontally extending upper and lower edges 67,68 and a second vertical common edge 69. The first and second plates 51, 52 are joined together in a right angle relationship along the common edges 66, 69. The in-corner unit 47 has a first in-corner plate 53 having first horizontally extending top and bottom edges 71, 72 (Fig. 2) and a first common vertical margin 73 and a second in-corner plate 54 having second horizontally extending top and bottom edges 76, 77 (FIG. 2) and a second common vertical margin 78. The first and second in-corner plates are joined together in a right angle relationship along the common margins 73, 78. The clip 18 has upper and lower relieved areas 81 and 82 for accommodating the thickness of the bottom wall 50 of a cross member such as member 14 (FIG. 2) where the clip 18 is installed to interconnect main and cross member side walls such as side walls 19 and 22 in FIG. 2. The relieved areas 81, 82 are provided by: a horizontal notch 83, 84 in the first upper and lower edges 63, 64 of the first out-corner plate 51 adjacent the first common edge 66, with each notch having a vertical dimension equal to the thickness of the bottom wall 50; and by dimensioning the second out-corner plate 52 to have a vertical extent equal to the vertical length of the first common edge 66 between the horizontal notches 83, 84. By providing a relieved area adjacent both the upper edge 67 and the lower edge 68 of the second out-corner plate 52, a single design of clip may be inverted to the orientation needed, placed above the corner to be connected with the pockets 48, 49 aligned with respective main member and cross member side walls, and slid downwardly to form either a right-hand or left-hand corner. When the clip 18 is installed as shown in FIG. 4, main member side wall 153 is in pocket 48 and cross member side wall 154 is in pocket 49. The clip 18 has a tactile indicator to identify proper orientation of the clip for installation. As shown in FIG. 7, the tactile indicator is in the form of an elongated bead projecting from the surface of second out-corner plate 52. Other suitable tactile indicators could be used and the tactile indicator could be placed on any of the plates 51, 52, 53 or 54. The elongated bead, when felt by the installer, will identify the proper orientation of the clip 18 for installation, which is with the bead 86 always facing the inside of a cross support member. In this orientation, the longer first out-corner plate 51 will always be positioned to extend down past the adjacent bottom wall 50 of a cross member and into contact with the bottom wall 50 of a main support member. The upper and lower relieved areas 81, 82 and the tactile indicator bead 86 facilitate error free installation without the need for visual inspection of the clip 18 before or during installation. The manufacturer need only manufacture a single design of clip and the installer need only have one design of clip in his supply pocket to thus reduce manufacturing costs and assembly time. During installation, a caulking material is used on the interfacing surfaces of the clip 18 and the bottom and side walls of the filter supporting main and cross members to seal the connection against fluid and air leakage.

FIG. 3 is a cross-section view of a filter supporting channel member with the sealant 24 in each of the channel members. For the purpose of illustration, it will be assumed that the filter supporting member is cross member 14 and the center wall 16 is essentially the same height as the two side walls 21, 22. Each filter 25 and 26 includes a filtering material 27 and 28. A peripheral flange 29 and 30 on each of the two filters extends into the sealant chamber where the sealant forms sealed interface 31' and 32' around the portion of the flange extending into the sealant 24'. The sealant is a heavy viscous material which allows the filter to seat in the operating position and allows the sealant to flow around the flange. Since the sealant is a viscous material, it flows slowly around to form the seal and does not present a problem of splashing due to vibration or any other movement so long as the assembly remains substantially level.

Referring to FIG. 4, the plan view of the assembled components as illustrated and described in FIG. 2 is shown. The clips 18 are in position to retain the cross members 14 and 15 in their assembled position on member 8. The center walls 16 and 17 abut the center wall 11 to form a seal at their intersection. This forms sealed peripheral channel chambers 31, 32, 33, 34 around each of the filter openings 35, 36, 37 and 38. Since each perimeter channel chamber is isolated from its adjacent channel chamber, the net effect is an isolation of the sealed fluid in adjacent chambers and any filter can be replaced with another filter without interfering with the seal of the adjacent filter.

FIG. 5 illustrates the effect of the fluid sealant seeking its own level. It does not run over the walls since the length of the channel chamber is limited by a partition on the end of each channel chamber. Although it is preferred to have a level ceiling, minor imperfections may be present or may be caused due to the settling of a building. Because of this preferred construction, the danger of leakage is eliminated.

FIG. 6. illustrates a wall supported channel 39 in which the side wall 40 of the channel 39 is supported on the wall 41 of the room. The interior wall 42 of the channel provides a support for the filter 43. The sealant 44 provides a seal around the peripheral flange 45 extending into the sealant. The operation of this channel is the same as that provided in the channel chambers as illustrated in FIG. 4, although only a single channel is necessary since it is mounted on the wall.

The filter device operates in substantially the following manner. The support beams 1 are carried on the ceiling of the room and the struts 2 are carried on the support beams which in turn carry the latticework 4. The level of the latticework can be adjusted by the turnbuckles 3 to assure reasonably level position of the latticework. The intersections are then joined by placing the clips 18 in their assembled position to retain the main filter support members 8 with the cross filter support members 14 and 15 as shown in FIG. 2 and assembled in FIG. 4. A caulking material can be used to assure seal integrity at the intersection as the assembly is made. When the assembly is completed, the sealant, which is a viscous material having a melting temperature above normal room temperature, is added to each perimeter channel chamber. The sealant is heated and poured into the channel chambers 9 and 10, as shown in FIG. 3, to reach the desired height in the chamber so they will cover the lower ends of the flanges 29 and 30 of the filters. When this level is reached, the filters then can be seated in position so they rest on the outer walls of the channels as indicated in FIG. 3 and FIG. 6. It is not necessary that the channels be pressed into the sealant since the sealant, although viscous, will allow the filter to settle in position and form an airtight seal around the filter once it is assembled. When it is assembled in the position as shown in FIGS. 3 and 6, the filter assembly provides an airtight sealing and filtering arrangements to assure clean air operating conditions when the heating or air conditioning ventilating system is in operation.

The embodiments of the invention in which an exclusive property or privilege is claimed are defined as follows:

1. An invertible corner connecting clip for use in completing either a right-hand or a left-hand corner when assembling a suspended ceiling latticework of the type including main and cross filter supported members each having spaced apart side walls extending vertically from a bottom wall, said side walls of said main member having notches spaced along its length, to permit free ends of said cross support members to set therein with said bottom wall of each cross support member overlying the bottom wall of said main support member to place said spaced side walls of each cross support member in left and right-hand corner forming relationship with said main support member side walls, said invertible corner connecting clip comprising:

an out-corner unit including a first out-corner plate having first horizontally extending upper and lower edges, and a first vertical common edge, a second out-corner corner plate having second horizontally extending upper and lower edges and a second vertical common edge, said first and second out-corner plates joined together along said common edges to form said out-corner unit;

an in-corner unit including a first in-corner plate having first horizontally extending top and bottom edges and a first common vertical margin, a second in-corner plate having second horizontally extending top and bottom edges and a second common vertical margin;

said first and second in-corner plates joined together along said common margins to form said in-corner unit;

means connecting said out-corner unit and in-corner units in spaced parallel relationship to each other to form pockets of uniform width to receive said side walls of said main and cross support members therebetween;

said first upper and lower edges of said first out-corner plate each having a horizontal notch therein adjacent said first common edge, said notch having a vertical dimension equal to the thickness of said bottom wall; and said second out-corner plate having a vertical dimension equal to the vertical length of said first common edge between said horizontal notches to define upper and lower relieved areas adjacent the top and bottom edges of said second out-corner plate for accommodating the thickness of said bottom wall when assembled in a latticework to permit inversion of said clip for use in completing either a right or a left-hand corner connection between main and cross member side walls.

2. An invertible corner connecting clip according to claim 1 wherein said out-corner unit has a tactile indicator thereon to identify proper orientation of said clip for installation.

3. An invertible corner connecting clip according to claim 2 wherein said tactile indicator is an elongated bead projecting from the surface of one of said out-corner plates.

4. An invertible corner connecting clip according to claim 1 wherin said in-corner unit has a tactile indicator thereon to identify proper orientation of said clip for installation.

5. An invertible corner connecting clip according to claim 4 wherein said tactile indicator is an elongated bead projecting from the surface of one of said in-corner plates.

6. An invertible corner connecting clip for use in connecting the vertical side walls of a main support member with vertical side walls of a cross member, said main support member and said cross support member each having a bottom wall with said cross member bottom wall, when assembled, extending horizontally in overlying relation to the horizontal bottom wall of said main member with said vertical side walls of said main and cross support members forming left-hand and right-hand corners, said invertible corner connecting clip comprising:

an out-corner unit having parallel space apart first and second out-corner plates connected in right angle relation to each other, each of said out-corner plates having a horizontally extended upper and lower edge;

an in-corner unit having parallel spaced apart first and second in-corner plates connected in right angle relation to each other;

means connecting said out-corner unit and said in-corner unit together in spaced parallel corner forming relationship to each other to define first and second pockets for receiving said side walls of said main and cross support members when said clip is in an installed position;

said first out-corner unit having upper and lower horizontally extending relieved areas along both said upper and lower edges of one of said out-corner plates dimensioned to accommodate the thickness of said cross member bottom wall when installed, to permit single design of clip to be inverted to complete either a right or a left-hand corner connection between said main and cross member side walls.

* * * * *